US012189035B2

(12) United States Patent
Ye et al.

(10) Patent No.: US 12,189,035 B2
(45) Date of Patent: Jan. 7, 2025

(54) METHOD AND APPARATUS FOR IMPROVING RESOLUTION OF LIDAR, AND LIDAR

(71) Applicant: Hesai Technology Co., Ltd., Shanghai (CN)

(72) Inventors: Liangchen Ye, Shanghai (CN); Shaoqing Xiang, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/443,081

(22) Filed: Feb. 15, 2024

(65) Prior Publication Data

US 2024/0183988 A1    Jun. 6, 2024

Related U.S. Application Data

(63) Continuation of application No. PCT/CN2022/077589, filed on Feb. 24, 2022.

(30) Foreign Application Priority Data

Aug. 16, 2021 (CN) .......................... 202110938263.7

(51) Int. Cl.
*G01S 17/89*     (2020.01)
*G01S 7/481*    (2006.01)

(52) U.S. Cl.
CPC ............ *G01S 17/89* (2013.01); *G01S 7/4815* (2013.01); *G01S 7/4816* (2013.01)

(58) Field of Classification Search
CPC .......... G01S 17/89; G01S 17/88; G01S 17/00; G01S 7/4815; G01S 7/481; G01S 7/4816;

(Continued)

(56) References Cited

U.S. PATENT DOCUMENTS

2018/0232947 A1*  8/2018  Nehmadi ................ G01S 7/295
2018/0259645 A1*  9/2018  Shu ........................ G01S 7/4865

(Continued)

FOREIGN PATENT DOCUMENTS

CN      109597096 A      4/2019
CN      111541015 A      8/2020

(Continued)

OTHER PUBLICATIONS

International Search Report, Application No. PCT/CN2022/077589, Dated May 20, 2022.

(Continued)

*Primary Examiner* — Mohamed Charioui
(74) *Attorney, Agent, or Firm* — Chiesa Shahinian & Giantomasi PC

(57) ABSTRACT

A method and an apparatus for improving the resolution of a LiDAR. The LiDAR includes a plurality of actual channels, each of which corresponds to one emitter unit at an emitting end and one detector unit at a detecting end. The method includes determining at least one interpolation channel to be generated; separately determining, for each interpolation channel to be generated, one or more associated channels among the plurality of actual channels; determining weights of the one or more associated channels with respect to the interpolation channel; and generating a waveform of the interpolation channel based on waveform information of the one or more associated channels and the weights thereof, and determining point cloud data of the LiDAR based on the waveform information of each actual channel and each interpolation channel. The solution of this disclosure can avoid increasing the hardware load thereon.

20 Claims, 8 Drawing Sheets

(58) Field of Classification Search
CPC ...... G01S 7/4865; G01S 17/10; G01S 7/4817; G01S 7/486; G01S 17/18; G01S 17/931
See application file for complete search history.

(56) References Cited

U.S. PATENT DOCUMENTS

| | | | |
|---|---|---|---|
| 2018/0292206 A1 | 10/2018 | Ohki | |
| 2019/0042883 A1* | 2/2019 | Park | G06V 10/764 |
| 2019/0158813 A1* | 5/2019 | Rowell | H04N 13/111 |
| 2020/0209401 A1 | 7/2020 | Motoyama et al. | |
| 2020/0217937 A1* | 7/2020 | Mammou | G06T 9/004 |

FOREIGN PATENT DOCUMENTS

| | | |
|---|---|---|
| CN | 111708038 A | 9/2020 |
| CN | 112230198 A | 1/2021 |
| CN | 112313534 A | 2/2021 |
| DE | 102019200733 A1 | 7/2020 |
| JP | 2016219622 A | 12/2016 |
| KR | 102274688 B1 | 7/2021 |

OTHER PUBLICATIONS

Written Opinion of the International Search Report, Application No. PCT/CN2022/077589, Dated May 20, 2022.

Extended European Search Report mailed Sep. 11, 2024 mailed in connection with European Patent Application No. 22857222.8, 10 pgs.

\* cited by examiner

METHOD AND APPARATUS FOR IMPROVING RESOLUTION OF LIDAR, AND LIDAR

This application claims priority to PCT Application No. PCT/CN2022/077589 filed Feb. 24, 2022, which claims priority to Chinese patent application No. 202110938263.7 filed with the China National Intellectual Property Administration on Aug. 16, 2021 and entitled "METHOD AND APPARATUS FOR IMPROVING RESOLUTION OF LIDAR, AND LIDAR", the contents of which are incorporated herein by reference in their entireties.

TECHNICAL FIELD

This disclosure relates to the technical field of signal processing, and specifically relates to a method and an apparatus for improving the resolution of a LiDAR, and further relates to a LiDAR.

BACKGROUND

LiDAR is a radar system that detects the position, velocity and other feature quantities of a target by transmitting laser beams. The working principle thereof is to emit a detection signal (laser beam) to the target, and then compare the received signal (echo pulse signal) reflected back from the target with the transmitted signal, and after appropriate signal processing, the relevant information about the target can be obtained, such as the distance, orientation, height, velocity, posture, and even shape of the target, thereby detecting, tracking, and identifying the target.

With the development of the LiDAR technology, the requirements for its resolution are getting higher and higher. Whether it is a mechanical rotating LiDAR, a micro-electro-mechanical system (MEMS) LiDAR, a flash 2D LiDAR, or an optical phased array (OPA) LiDAR, achieving higher resolution is an important indicator for improving performance parameters of the LiDAR. In the prior art, there are typically two ways to improve the resolution. One way is to meet the high-resolution requirement through hardware setup by means of adding pairs of emitter and receiver and corresponding analog to digital converter (ADC) channels or time to digital converter (TDC) channels, which will not only consume a lot of computing resources but also greatly increase the device power consumption. In addition, adding pairs of emitter and receiver will also increase the possibility of cross-talk between channels, which will lead to a decrease in the accuracy of the detection. The other way is to perform certain processing algorithms, such as a deep convolutional neural network processing, on the point cloud information outputted from a LiDAR, which obtains new point clouds at some positions through computation, thereby improving the resolution.

However, the problem with the neural network processing based directly on point cloud information is that the new point clouds obtained based on point cloud computation have no echo pulse signal that can be directly relied on, and its accuracy is not high enough.

SUMMARY OF THE DISCLOSURE

In one aspect, embodiments of this disclosure provide a method and an apparatus for improving the resolution of a LiDAR, which effectively improve the resolution of the existing LiDAR without increasing the hardware load thereon.

In another aspect, embodiments of this disclosure provide a LiDAR that can have higher resolution compared with a LiDAR having the same hardware architecture.

To this end, embodiments of this disclosure provide the following technical solutions:

A method for improving the resolution of a LiDAR, the LiDAR including a plurality of actual channels, wherein one actual channel corresponds to one emitter unit at an emitting end and one detector unit at a detecting end, the method including:
  determining at least one interpolation channel to be generated;
  separately determining, for each interpolation channel to be generated, one or more associated channels among the plurality of actual channels that are related to the interpolation channel to be generated;
  determining weights of the one or more associated channels with respect to the interpolation channel to be generated; and
  generating a waveform of the interpolation channel based on waveform information of the one or more associated channels and the weights thereof, and determining point cloud data of the LiDAR based on the obtained waveform information of each actual channel and each interpolation channel.

Optionally, the step of determining at least one interpolation channel to be generated further includes: determining the at least one interpolation channel to be generated based on a range of field of view angles for which interpolation is required.

Optionally, the at least one interpolation channel is distributed between all or part of the actual channels.

Optionally, the step of separately determining one or more associated channels among the plurality of actual channels that are related to the interpolation channel to be generated further includes: determining actual channels from which the distances to the interpolation channel is within a set range as associated channels of the interpolation channel.

Optionally, the weight of the associated channel is determined based on any one or more of:
  the distance from the associated channel to the interpolation channel; or
  signal quality of the associated channel; or
  field of view angle of the associated channel.

Optionally, emitter units of the LiDAR and their corresponding receiver units are both in two-dimensional arrangements.

Optionally, among the plurality of associated channels corresponding to the interpolation channel to be generated, there are at least two vertically adjacent actual channels and at least two horizontally adjacent actual channels.

Optionally, when the LiDAR uses multi-pulse coding, the step of generating a waveform of the interpolation channel based on waveform information of the associated channels and the weights thereof includes: generating the waveform of the interpolation channel based on waveform information of the first pulses received by the associated channels and the weights thereof.

Optionally, the LiDAR emits signal light a plurality of times in one cycle; and the method further includes: determining, after each emission of the signal light and based on the obtained waveform information of each actual channel and each interpolation channel, point cloud data that corresponds to each piece of waveform information and corresponds to this transmission; and determining one frame of point cloud data of the LiDAR based on all the point cloud data determined in one cycle.

An apparatus for improving the resolution of a LiDAR, the LiDAR including a plurality of actual channels, wherein one actual channel corresponds to one emitter unit at an emitting end and one detector unit at a detecting end, the apparatus including:
  an interpolation channel determination module for determining at least one interpolation channel to be generated;
  an associated channel determination module for separately determining, for each interpolation channel to be generated, one or more associated channels among the plurality of actual channels that are related to the interpolation channel to be generated;
  a weight determination module for determining weights of the one or more associated channels with respect to the interpolation channel to be generated; and
  an interpolation channel generation module for generating a waveform of the interpolation channel based on waveform information of the one or more associated channels and the weights thereof, and determining point cloud data of the LiDAR based on the obtained waveform information of each actual channel and each interpolation channel.

Optionally, the interpolation channel determination module is specifically used for determining the at least one interpolation channel to be generated based on a range of field of view angles for which interpolation is required.

Optionally, the at least one interpolation channel is distributed between all or part of the actual channels.

Optionally, the associated channel determination module is specifically used for determining actual channels from which the distances to the interpolation channel is within a set range as associated channels of the interpolation channel.

Optionally, the associated channel determination module determines the weight of the associated channel based on any one or more of:
  the distance from the associated channel to the interpolation channel; or
  signal quality of the associated channel; or
  field of view angle of the associated channel.

Optionally, emitter units of the LiDAR and their corresponding receiver units are both in two-dimensional arrangements.

Optionally, among the plurality of associated channels corresponding to the interpolation channel to be generated, there are at least two vertically adjacent actual channels and at least two horizontally adjacent actual channels.

Optionally, the LiDAR uses multi-pulse coding; and the interpolation channel generation module is specifically used for generating the waveform of the interpolation channel based on waveform information of the first pulses received by the associated channels and the weights thereof.

Optionally, the LiDAR emits signal light a plurality of times in one cycle; and the apparatus further includes: a first data determination module for determining, after each emission of the signal light and based on the obtained waveform information of each actual channel and each interpolation channel, point cloud data that corresponds to each piece of waveform information and corresponds to this emission; and a second data determination module for determining one frame of point cloud data of the LiDAR based on all the point cloud data determined in one cycle.

A LIDAR is provided, including the apparatus for improving the resolution of a LiDAR as previously described.

With the method and the apparatus for improving the resolution of a LiDAR provided in embodiments of this disclosure, based on a hardware structure of the LiDAR in which one actual channel corresponds to one emitter unit at an emitting end and one detector unit at a detecting end, interpolation is performed on actual channels to generate an interpolation channel without changing the hardware structure thereof, and in the process of the interpolation, the interpolation channel is generated based on the waveform information of one or more associated channels among a plurality of actual channels that are related to the interpolation channel to be generated and weights of the associated channels. In this way, point cloud data of the LiDAR is determined based on the obtained waveform information of each actual channel and each interpolation channel, thereby effectively improving the resolution of the existing LiDAR without increasing the hardware load thereon, which means that a LiDAR including this apparatus can have higher resolution compared with a LiDAR having the same hardware architecture.

DETAILED DESCRIPTION

To make the above objectives, features and beneficial effects of this disclosure more apparent and understandable, specific embodiments of this disclosure are described in detail below in conjunction with the accompanying drawings.

To address the problem of increases in the hardware load and device power consumption in the prior art that are caused by adding hardware channels, i.e., adding pairs of emitter and receiver as well as other hardware configurations in the corresponding channels to meet application requirements for high resolution, embodiments of this disclosure provide a method and an apparatus for improving the resolution of a LiDAR. Based on a hardware structure of the LiDAR in which one actual channel corresponds to one emitter unit at an emitting end and one detector unit at a detecting end, interpolation is performed on actual channels to generate an interpolation channel without changing the hardware structure thereof. During the process of the interpolation, the interpolation channel is generated based on the waveform information of one or more associated channels among a plurality of actual channels that are related to the interpolation channel to be generated and weights of the associated channels. In this way, it is possible to effectively improve the resolution of the existing LiDAR without increasing the hardware load thereon.

In some embodiments of this disclosure, the LiDAR includes a plurality of actual channels, wherein one actual channel corresponds to one emitter unit at an emitting end and one detector unit at a detecting end.

Figure 1:
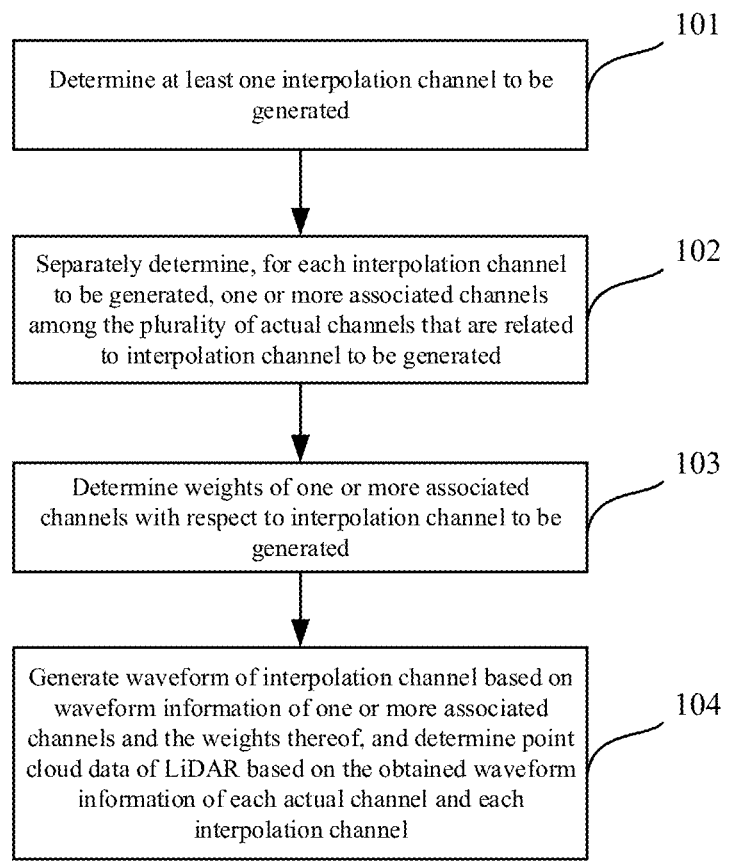
FIG. 1 is a flowchart of a method for improving the resolution of a LiDAR, consistent with embodiments of this disclosure.

FIG. 1 shows a flowchart of a method for improving the resolution of a LiDAR, consistent with embodiments of this disclosure, which includes the following steps:

Step 101: determining at least one interpolation channel to be generated.

Specifically, a plurality of actual channels for generating at least one interpolation channel to be generated can be determined based on a range of field of view angles for which interpolation is required. The number of interpolation channels between every two adjacent actual channels can be determined based on the level of resolution to be enhanced.

Here, the field of view of the LiDAR has a range of a horizontal field of view and a range of a vertical field of view, and the range of angles for the horizontal field of view and the range of angles for the vertical field of view are used to indicate the scanning ranges of the LiDAR in the horizontal direction and the vertical direction, respectively. For example, in the case of a mechanical rotating LiDAR, i.e., a LiDAR in which the emitter module and the receiver module are rotated at the same time by a rotating mechanism, the range of angles for the horizontal field of view thereof is typically a complete circle, which means that the angle for the horizontal field of view is 360 degrees, while the range of angles for the vertical field of view is typically determined by emitter units contained in the emitter module of the LiDAR. The angle for the vertical field of view is the sum of upward scanning angle relative to a horizontal direction and a downward scanning angle relative to the horizontal direction. For example, for a 64-line LiDAR, the scanning angle upward from the horizontal direction is 15° and the scanning angle downward from the horizontal direction is 25°, then the range of the angle for the vertical field of view is 40°. For another example, for a LiDAR in which the emitter module and the receiver module are fixed and a scanning module is used to scan the field of view, the range of the angle for the horizontal field of view and the range of the angel for the vertical field of view are typically determined by the scanning range of the scanning module.

That is, when an interpolation is performed in accordance with this disclosure, some or all of the ranges of field of view that need to be improved are first determined. For example, when an interpolation is required for the entire range for a field of view and the resolution is desired to be doubled, it can be determined that there is one interpolation channel to be generated between every two adjacent actual channels; or, for another example, when the requirement includes tripling the resolution of a range of field of view of ±5° within the range of angles for the vertical field of view, it is determined that two interpolation channels will be added uniformly between every two adjacent actual channels in the range of field of view.

Of course, those skilled in the art can understand that it is also possible to select a certain range within the vertical field of view angle as a range of angles for a field of view for which an interpolation is required. The selection of the certain range can be based on information such as the size, height, or the like of the target to be detected. And, within that range of field of view angles, at least one interpolation channel can be determined to be generated.

In addition, as needed, there may be one or more interpolation channels distributed between all or some of the actual channels.

Continuing to take the afore-mentioned 64-line LiDAR as an example, it is typically assumed that the distribution of laser beams is uniform under ideal conditions, then the angular resolution of this 64-line LiDAR would be 40°/64=0.625°. However, in some applications, beams of a LiDAR are not uniformly distributed vertically. For example, for the LiDAR used to detect ground vehicles in autonomous driving applications, to detect obstacles and at the same time to concentrate the laser beams on the vehicles of interest in the middle zone, the distribution of the beams is typically dense in the middle zone and sparse on two sides.

Thus, in practical applications, a plurality of interpolation channels can be determined within the range of angles for a field of view for which an interpolation is required. These interpolation channels can be uniformly or non-uniformly distributed between actual channels, and there can be zero or one or more interpolation channels between two actual channels, which is not limited in the embodiments of this disclosure.

Some examples of the way to determine interpolation channels are illustrated below.

Figure 2:
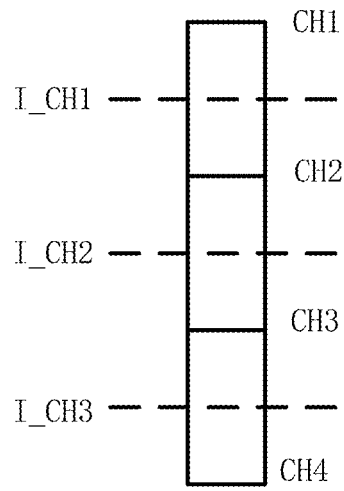
FIG. 2 is an example of an interpolation channel, consistent with embodiments of this disclosure.

For example, in the case of interpolating one interpolation channel between every two actual channels, as shown in FIG. 2, an interpolation channel I_CH1 is interpolated between the actual channel CH1 and the actual channel CH2, an interpolation channel I_CH2 is interpolated between the actual channel CH2 and the actual channel CH3, and so on. If there are N actual channels, the total number of channels after the interpolation (i.e., the number of actual channels plus the number of interpolation channels) is 2N−1, which is substantially twice the original number of actual channels.

Figure 3:
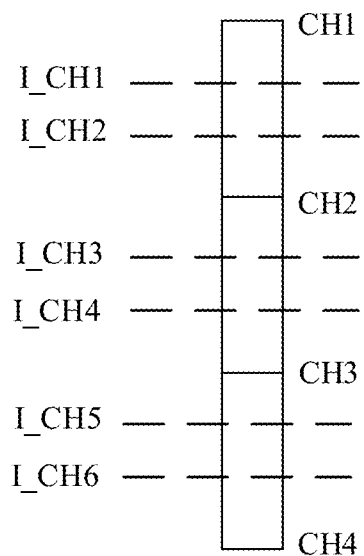
FIG. 3 is another example of an interpolation channel, consistent with embodiments of this disclosure.

For another example, two interpolation channels are interpolated between two actual channels. As shown in FIG. 3, an interpolation channel I_CH1 and an interpolation channel I_CH2 are interpolated between the actual channel CH1 and the actual channel CH2; an interpolation channel I_CH3 and an interpolation channel I_CH4 are interpolated between the actual channel CH2 and the actual channel CH3; an interpolation channel I_CH5 and an interpolation channel I_CH6 are interpolated between the actual channel CH3 and the actual channel CH4, and so on. If there are N actual channels, the total number of channels after the interpretation is 3N−2, which is substantially three times the original number of actual channels.

Figure 4:
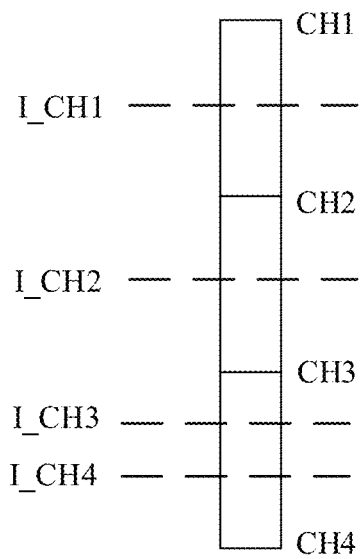
FIG. 4 is another example of an interpolation channel, consistent with embodiments of this disclosure.
Figure 5:
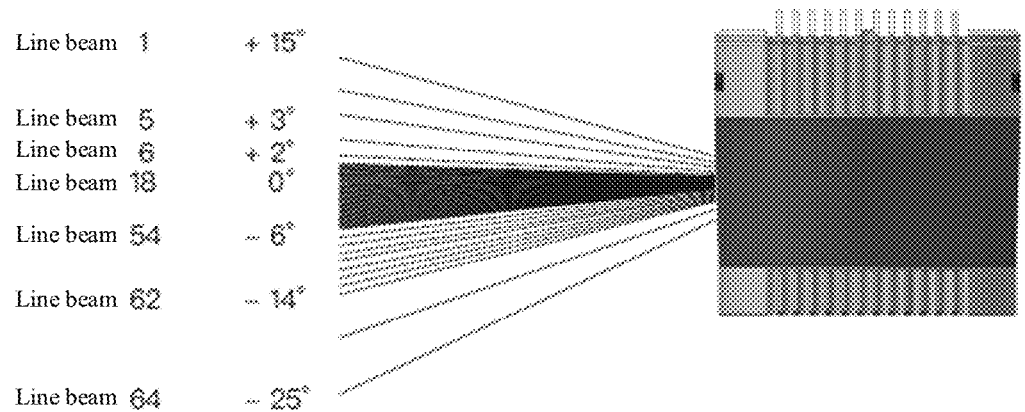
FIG. 5 is another example of an interpolation channel, consistent with embodiments of this disclosure.

For another example, one or more interpolation channels are interpolated between two actual channels. As shown in FIG. 4, an interpolation channel I_CH1 is interpolated between the actual channel CH1 and the actual channel CH2; an interpolation channel I_CH2 is interpolated between the actual channel CH2 and the actual channel CH3; and an interpolation channel I_CH3 and an interpolation channel I_CH4 are interpolated between the actual channel CH3 and the actual channel CH4.

For another example, it is also possible to perform interpolation only near certain actual channels. As shown in FIG.

5, interpolations are performed only for actual channels within a range of 5° above and below the middle of the vertical field of view to improve the resolution in that field of view region.

Step 102: separately determining, for each interpolation channel to be generated, one or more associated channels among the plurality of actual channels that are related to a respective interpolation channel to be generated.

Specifically, for each interpolation channel to be generated, all of the actual channels can be taken as associated channels of that interpolation channel. Of course, to reduce the amount of computation when performing subsequent interpolations, it is also possible to use only actual channels from which the distances to the interpolation channel is within a set range as the associated channels of the interpolation channel, which is not limited in the embodiments of this disclosure.

Step 103: determining weights of the one or more associated channels with respect to the interpolation channel to be generated.

As mentioned earlier, actual channels from which the distances to the interpolation channel are within a set range can be taken as the associated channels of the interpolation channel, and since different actual channels will have different effects on the interpolation channel, these effects need to be taken into account when performing interpolation calculations. To facilitate the subsequent calculation, these effects can be expressed as weights of the associated channels, which means that a corresponding weight is set for each associated channel of that interpolation channel.

In practical applications, the weight of the associated channel may be determined based on, but not limited to, any one or more of:

the distance from the associated channel to the interpolation channel. For example, the shorter the distance, the greater a distance weight is; or a signal quality of the associated channel. For example, the higher the signal quality, the greater a signal weight is; or angles of a field of view of the associated channel. For example, the angle of a field of view is within a region of interest (ROI) or not. When the angle for the field of view is within the ROI, the field of view angle has a greater weight, and vice versa, the field of view angle has a smaller weight.

For example, when one interpolation channel is interpolated between two actual channels CH1 and CH2, the two adjacent actual channels are taken as the associated channels of the interpolation channel, and each associated channel has a weight of 0.5.

When a plurality of interpolation channels are interpolated between two actual channels, the respective weights can be changed based on the positions of the interpolation channels with respect to the actual channels on both sides. For example, an interpolation channel I_CH1 and an interpolation channel I_CH2 need to be interpolated between the actual channel CH1 and the actual channel CH2. It is assumed that the two interpolation channels I_CH1 and I_CH2 are uniformly distributed between the actual channel CH1 and the actual channel CH2, and the actual channel CH1 and the actual channel CH2 are taken as associated channels of the interpolation channel I_CH1 and the interpolation channel I_CH2. In this example, for the interpolation channel I_CH1, the weight of its associated channel I_CH1 is ⅔, and the weight of its associated channel I_CH2 is ⅓; and for the interpolation channel I_CH2, the weight of its associated channel I_CH1 is ⅓, and the weight of its associated channel I_CH2 is ⅔.

When a plurality of interpolation channels are interpolated between two actual channels, the respective weights can also be determined based on the positions of the interpolation channels with respect to the actual channels on both sides and the signal qualities of the actual channels. For example, a channel with the highest signal quality is set to have a weight influence factor of 1, its direct adjacent channel is 0.9, its next adjacent channel is 0.8, and so on.

When multiple types of weights are used to determine the total weight of each associated channel, the proportion of each type of weight in the total weight can be determined separately as needed, and then the total weight of each associated channel with respect to the interpolation channel can be determined.

For example, when it is needed to consider the aforementioned distance weight, signal weight, and field of view angle weight, each of these three types of weights may account for ⅓ of the total weight; for another example, when it is needed to consider only the distance weight and the signal weight, each of these two types of weights may account for ½ of the total weight; or for a further example, when the influence of signal quality on the interpolation channel needs to be considered to have a greater impact, the distance weight can be set to account for ⅓ of the total weight, the signal weight may be set to account for ⅔, or the like. Those skilled in the art can set the proportion of each category of weight in the total weight based on the actual situation and requirements to obtain the interpolation channel with the best quality, which will not be repeated herein.

Step 104: generating a waveform of the interpolation channel based on waveform information of the one or more associated channels and the weights thereof, and determining point cloud data of the LiDAR based on the obtained waveform information of each actual channel and each interpolation channel.

For the existing N actual channels, the signal of each channel is set as Wave(N). Wave(N) is used to represent information of the waveform obtained by the actual channel. Specifically, different kinds of information can be included as follows:

1) A specific sampling waveform, wherein the sampling waveform can be characterized by a plurality of sampling points or, alternatively, by a curve obtained based on the fitting of the sampling points.
2) Commonly used waveform information related to a pulse, for example: front edge point, pulse width, peak value, or the like.

When performing interpolation, the waveform of the interpolation channel is obtained based on the waveform information of the associated channels related to the interpolation channel and in combination with the weights of the associated channels.

The Mth interpolation channel is characterized by In_Wave(M). As mentioned earlier, for each interpolation channel to be generated, all of the actual channels can be taken as associated channels of that interpolation channel. Therefore, the waveform of the interpolation channel can be obtained based on the following generalized signal synthesis formula:

$$\text{In\_Wave}(M) = A_{M,1} \times \text{Wave}(1) + A_{M,2} \times \text{Wave}(2) + \ldots + A_{M,N} \text{Wave}(N),$$

where $A_{M,i}$ (i=1,2,3, . . . , N) is the weight information of each actual channel, which is used to characterize the magnitude of the influence of each actual detected channel with respect to In_Wave(M), and $A_{M,1}+A_{M,2}+\ldots+A_{M,N}=1$.

Based on this generalized formula, the weight of an actual channel that is not associated with the interpolation channel, i.e., a non-associated channel of the interpolation channel, can be set to 0.

Of course, during the calculation, it is also possible to select only the waveform information of the associated channels of the interpolation channel and the weights of the associated channels to carry out the calculation, which is not limited in the embodiments of this disclosure.

Figure 6:
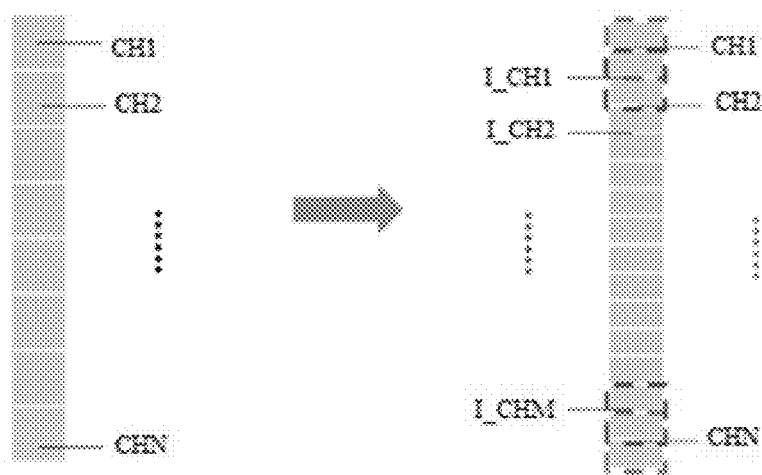
FIG. 6 is an example of generating a waveform of an interpolation channel, consistent with embodiments of this disclosure.

For example, in the interpolating approach shown in FIG. 6, the waveform signal of the CH1.5 channel, i.e., the interpolation channel 1_CH1, is obtained based on the waveform information of the actual channels CH1 and CH2 using the calculation formula as follows:

Wave(CH1.5)=$A_{1.5,1}$×Wave(CH1)+$A_{1.5,2}$×Wave(CH2), where when the channel 1.5 is located in an intermediate position between the channels CH1 and CH2, the values can be $A_{1.5,1}=A_{1.5,2}=0.5$.

For another example, in the interpolating approach shown earlier in FIG. 3, the interpolation channel I_CH1 and the interpolation channel I_CH2 need to be interpolated between the actual channel CH1 and the actual channel CH2, where the interpolation channel I_CH1 and the interpolation channel I_CH2 are obtained based on the waveform information of the actual channel CH1 and the actual channel CH2 using the calculation formula as follows:

In_Wave(*I*_CH1)=⅔*Wave(CH1)+⅓*Wave(CH2); and

In_Wave(*I*_CH2)=⅓*Wave(CH1)+⅔*Wave(CH2).

Figure 7:
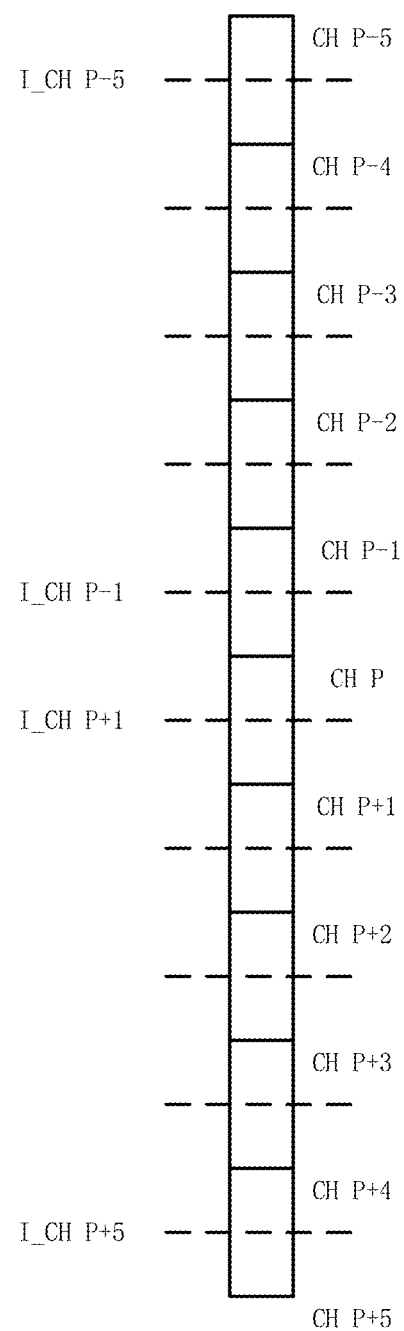
FIG. 7 is another example of generating a waveform of an interpolation channel, consistent with embodiments of this disclosure.

For another example, in the interpolating approach shown in FIG. 7, interpolation needs to be performed near the actual channel P, where five interpolation channels are added in each of two adjacent directions and the waveforms of the interpolation channels are calculated as follows:

In_Wave(*P* − 5) = $A_{P-5,1}$ * Wave(*P* − 5) + $A_{N+1,2}$ * Wave(*P* − 4);

In_Wave(*P* − 4) = $A_{P-4,1}$ * Wave(*P* − 4) + $A_{N+2,2}$ * Wave(*P* − 3);

...

In_Wave(*P* + 5) = $A_{P+4,1}$ * Wave(*P* + 4) + $A_{P+52}$ * Wave(*P* + 5).

For another example, it is assumed that the signal weights of the actual channels (wl and wr) on both sides of the interpolation channel Wx are 0.8 and 0.7, respectively, and that the distances from the interpolation channel Wx to the actual channels on respective sides are ⅓ and ⅓, respectively. In addition, the distance weights account for ½ of the total weight, and the signal weights account for ½ of the total weight. The actual channel wl and the actual channel wr are taken as the associated channels of the interpolation channel Wx. Thus, for the interpolation channel Wx, its associated channel wl has a weight of ⅔, and its associated channel I_CH2 has a weight of ⅓. For the interpolation channel I_CH2, its associated channel I_CH1 has a weight of ⅓, and its associated channel I_CH2 has a weight of ⅔. Then, the waveform of the interpolation channel Wx is calculated as follows:

$$Wx = \frac{1}{2}\left(\frac{2}{3}wl + \frac{1}{3}wr\right) + \frac{1}{2}\left(\frac{7}{15}wl + \frac{8}{15}wr\right) = \left(\frac{17}{30}wl + \frac{13}{30}wr\right).$$

It should be noted that in the case where a plurality of types of weights are considered, the calculation for generating the waveform of the interpolation channel based on the waveform information of the associated channels and the weights thereof can refer to the calculation approach for the interpolation channel Wx described above, and will not be illustrated by way of example herein.

The method for improving the resolution of a LiDAR provided in embodiments of this disclosure is based on a hardware structure of the LiDAR in which one actual channel corresponds to one emitter unit at an emitting end and one detector unit at a detecting end. An interpolation is performed on actual channels to generate an interpolation channel without changing the hardware structure thereof, and in the process of the interpolation, the interpolation channel is generated based on the waveform information of one or more associated channels among a plurality of actual channels and weights of the associated channels. The plurality of actual channels are related to the interpolation channel to be generated. In this way, point cloud data of the LiDAR is determined based on the obtained waveform information of each actual channel and each interpolation channel, thereby effectively improving the resolution of the existing LiDAR without increasing the hardware load thereon, which means that a LiDAR including this apparatus can have a higher resolution compared with a LiDAR having the same hardware architecture.

It should be noted that, in practical applications, in certain kinds of LiDARs, different detection channels (i.e., actual channels) have different gating times. For such situations, when determining the associated channels for each interpolation channel and the weights thereof, the adjacent channels for the interpolation channel can be accordingly changed based on the gating time of each actual channel. That is, when the plurality of actual channels has different gating times, for the interpolation channel to be generated, at different gating times, different associated channels are respectively selected to generate that interpolation channel. For example, when an interpolation channel corresponding to a certain angle in a field of view is required to be generated, the waveform of the interpolation channel can be generated from the waveform information of the actual channels CH5 and CH7 in a gating mode 1, and the waveform of the interpolation channel can be generated from the waveform information of the actual channels CH4 and CH6 in a gating mode 2, and so on, and in the two modes, the actual channels can use different weight values.

Further, in certain kinds of LiDARs, the laser signal can be coded using multi-pulse coding, and for the case of multi-pulse coding, since the timings of the arrival of the second pulses are not easy to align, the waveform of the interpolation channel can also be generated based on waveform information of the first pulses received by the associated channels and the weights thereof.

Figure 8:
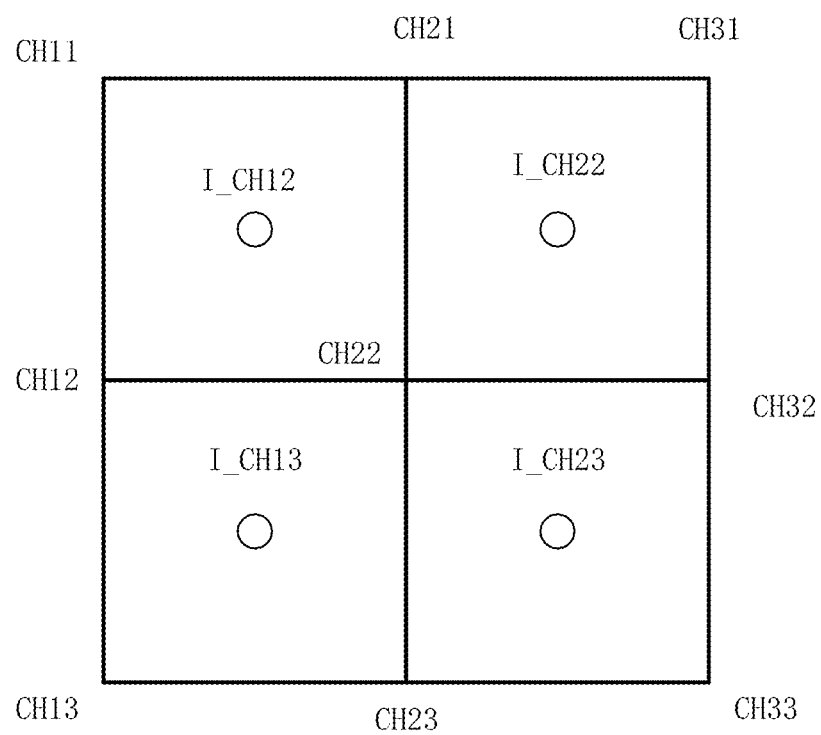
FIG. 8 is a schematic diagram of interpolation channels in a LiDAR in two-dimensional arrangements, consistent with embodiments of this disclosure.

Further, in certain kinds of LiDARs, the emitter units of the LiDAR and their corresponding receiver units are both in two-dimensional arrangements. As shown in FIG. 8, for such a case, an interpolation can be performed for the two-dimensional receiving channels, wherein among a plurality of associated channels corresponding to the interpolation channel to be generated, there are at least two vertically adjacent actual channels and at least two horizontally adjacent actual channels. The interpolation channels in the example in FIG. 8 are I_CH12, I_CH22, I_CH13, and I_CH23.

For such two-dimensional channels, their interpolation channels can be determined based on the following formula:

$$\mathrm{In\_Wave}(i,j) = A_{i,j-1} * \mathrm{Wave}(i,j-1) + A_{i,j-1} * \mathrm{Wave}(i+1,j-1) + A_{i+1,j} * \mathrm{Wave}(i+1,j) + A_{i+1,j} * \mathrm{Wave}(i+1,j),$$

where i and j denote the horizontal and vertical arrangement serial numbers of the actual channels, respectively.

Figure 9:
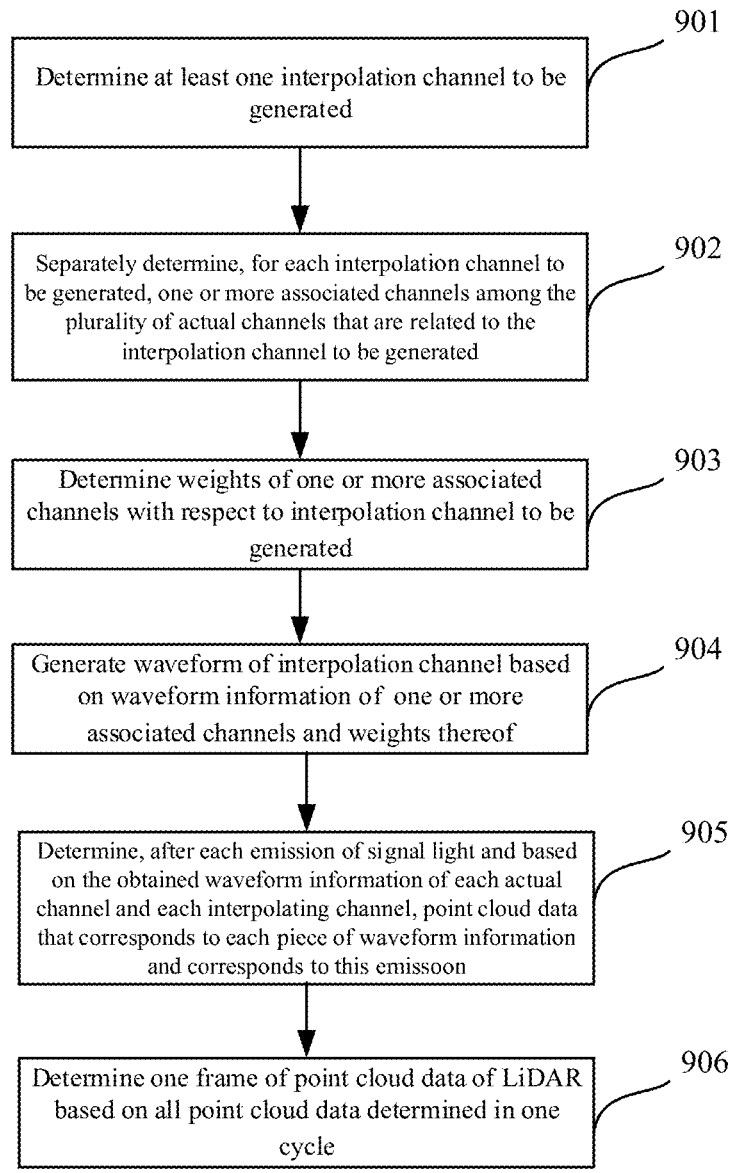
FIG. 9 is another flowchart of a method for improving the resolution of a LiDAR, consistent with embodiments of this disclosure.

FIG. 9 shows another flowchart of a method for improving the resolution of a LiDAR, consistent with embodiments of this disclosure.

In this embodiment, the LiDAR emits signal light a plurality of times in one cycle; and the method includes the following steps:

Step 901: determining at least one interpolation channel to be generated.

Step 902: separately determining, for each interpolation channel to be generated, one or more associated channels among the plurality of actual channels that are related to the interpolation channel to be generated.

Step 903: determining weights of the one or more associated channels with respect to the interpolation channel to be generated.

Step 904: generating a waveform of the interpolation channel based on waveform information of the one or more associated channels and the weights thereof.

The above steps 901 to 904 are the same as steps 101 to 104 in the previous FIG. 1 and will not be repeated herein.

Step 905: determining, after each emission of the signal light and based on the obtained waveform information of each actual channel and each interpolation channel, point cloud data that corresponds to each piece of waveform information and corresponds to this emission.

Step 906: determining one frame of point cloud data of the LiDAR based on all the point cloud data determined in one cycle.

The point cloud data can be taken as an output from the LiDAR, and compared with the point cloud data outputted only by the actual channels, the point cloud data outputted based on the interpolation channels and the actual channels can enable the LiDAR to have a higher resolution, thus making it possible to effectively improve the performance of the LiDAR without increasing the hardware load.

Figure 10:
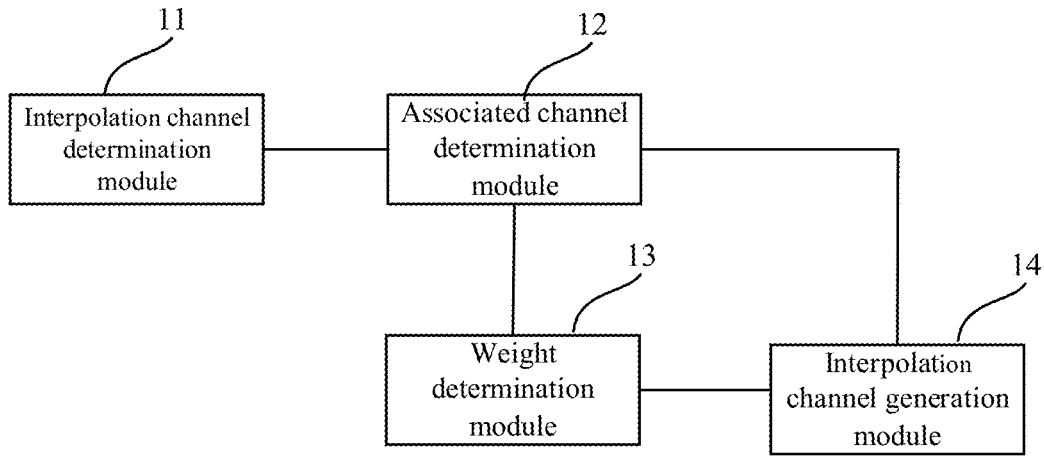
FIG. 10 is a structural block diagram of an apparatus for improving the resolution of a LiDAR, consistent with embodiments of this disclosure.

Accordingly, embodiments of this disclosure further provide an apparatus for improving the resolution of a LiDAR, as shown in FIG. 10, which is a structural block diagram of the apparatus.

In this embodiment, the apparatus includes the following modules:
an interpolation channel determination module 11 for determining at least one interpolation channel to be generated;
an associated channel determination module 12 for separately determining, for each interpolation channel to be generated, one or more associated channels among the plurality of actual channels that are related to the interpolation channel to be generated;
a weight determination module 13 for determining weights of the one or more associated channels with respect to the interpolation channel to be generated; and
an interpolation channel generation module 14 for generating waveform information of the interpolation channel based on waveform information of the one or more associated channels and the weights thereof, and determining point cloud data of the LiDAR based on the obtained waveform information of each actual channel and each interpolation channel.

Among them, the interpolation channel determination module 11 can specifically be used for determining the at least one interpolation channel to be generated based on a range of angles for a field of view for which interpolation is required. In addition, there can be at least one interpolation channel distributed between all or some of the actual channels.

Among them, the associated channel determination module 12 can specifically be used for determining actual channels from which the distances to the interpolation channel is within a set range as associated channels of the interpolation channel. Of course, there can be various factors affecting the weight of the associated channel. For example, the weight of the associated channel can be determined based on, but not limited to, any one or more of:
the distance from the associated channel to the interpolation channel; or
signal quality of the associated channel; or
field of view angle of the associated channel.

The specific calculation approach for the interpolation channel generation module 14 to generate a waveform of an interpolation channel based on the waveform information of one or more associated channels and the weights thereof has been described in detail in the previous description of the method of this disclosure, and will not be repeated herein.

The apparatus for improving the resolution of a LiDAR provided in embodiments of this disclosure is based on a hardware structure of the LiDAR in which one actual channel corresponds to one emitter unit at an emitting end and one detector unit at a detecting end. An interpolation is performed on actual channels to generate an interpolation channel without changing the hardware structure thereof, and in the process of the interpolation, the interpolation channel is generated based on the waveform information of one or more associated channels among a plurality of actual channels and the weight of the associated channels. The plurality of actual channels are related to the interpolation channel to be generated. In this way, point cloud data of the LiDAR is determined based on the obtained waveform information of each actual channel and each interpolation channel, thereby effectively improving the resolution of the existing LiDAR without increasing the hardware load thereon, which means that a LiDAR including this apparatus can have higher resolution compared with a LiDAR having the same hardware architecture.

It should be noted that, in certain kinds of LiDARs, the emitter units of the LiDAR and their corresponding receiver units can be in the form of two-dimensional arrangements. Accordingly, among the plurality of associated channels corresponding to the interpolation channel to be generated, there are at least two vertically adjacent actual channels and at least two horizontally adjacent actual channels.

In certain non-limiting examples, the LiDAR can use multi-pulse coding. For the case of multi-pulse coding, since the timings of the arrival of the second pulses are not easy to align, the interpolation channel generation module 14 can also generate the waveform of the interpolation channel based on the waveform information of the first pulses received by the associated channels and the weights thereof.

In certain non-limiting examples, the LiDAR can emit signal light a plurality of times in one cycle. Accordingly, as shown in FIG. 11, another structural block diagram of an apparatus for improving the resolution of a LiDAR, consistent with embodiments of this disclosure, is illustrated.

Figure 11:
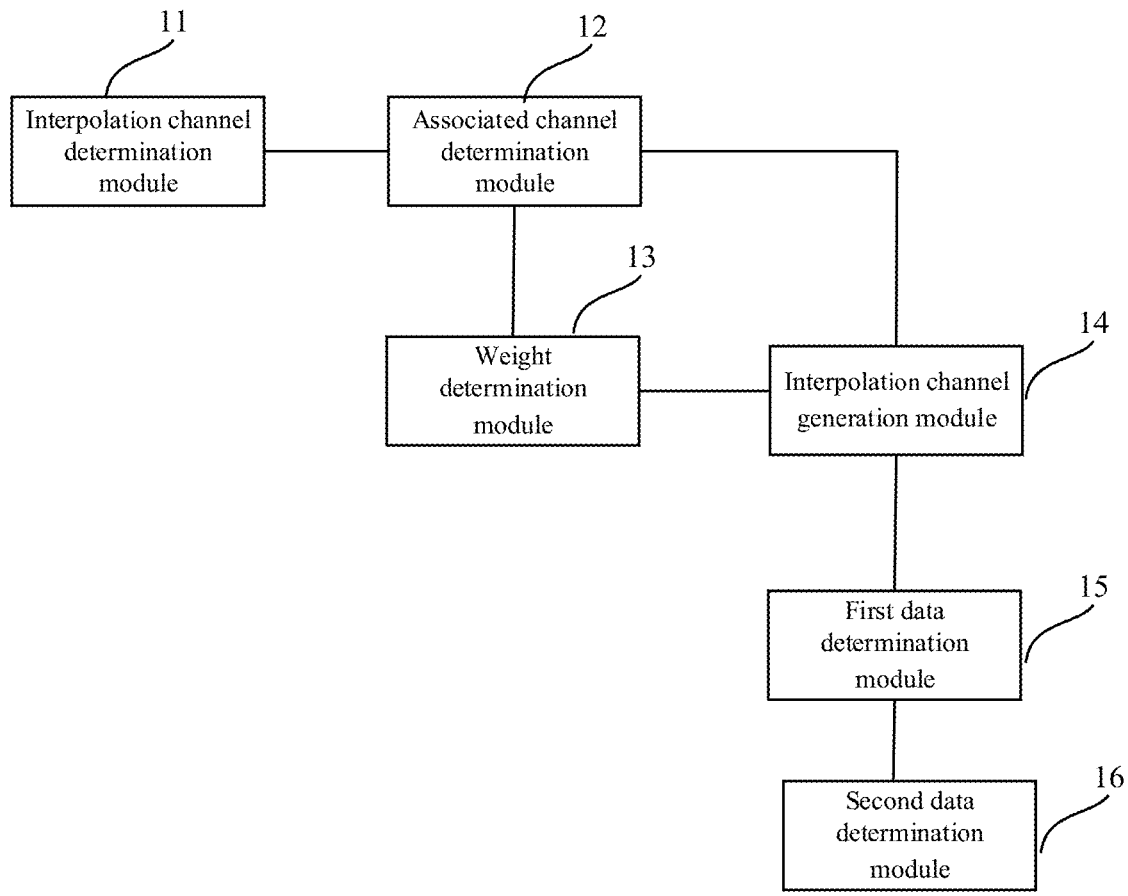
FIG. 11 is another structural block diagram of an apparatus for improving the resolution of a LiDAR, consistent with embodiments of this disclosure.

The difference from the embodiments shown in FIG. 10 is that in these embodiments shown in FIG. 11, the apparatus further includes the following modules:

a first data determination module 15 for determining, after each emission of the signal light and based on the obtained waveform information of each actual channel and each interpolation channel, point cloud data that corresponds to each piece of waveform information and corresponds to this emission; and a second data determination module 16 for determining one frame of point cloud data of the LiDAR based on all the point cloud data determined in one cycle.

It should be noted that the point cloud data can be taken as an output from the LiDAR, and compared with the point cloud data outputted only by the actual channels, the point cloud data outputted based on the interpolation channels and the actual channels can enable the LiDAR to have a higher resolution, thus making it possible to effectively improve the performance of the LiDAR without increasing the hardware load.

LiDARs having the above apparatus for improving the resolution of a LiDAR can have a higher resolution and scanning performance compared to the existing LiDAR with the same number of channels.

It should be noted that the LiDAR referred to in the embodiments of this disclosure can be a LiDAR of any structural type, such as a mechanical rotating radar, a micro electro mechanical system (MEMS) radar, or a flash area array LiDAR, or an optical phased array (OPA) LiDAR, or the like, which is not limited in the embodiments of this disclosure.

In specific implementations, with respect to the various modules/units contained in the various apparatuses and products described in the above embodiments, they can be software modules/units, or hardware modules/units, or they can also be partly software modules/units and partly hardware modules/units.

For example, for various apparatuses and products applied to or integrated into a chip, various modules/units contained therein can all be implemented by means of hardware such as circuitry, or at least part of the modules/units can be implemented by means of a software program which runs on a processor integrated within the chip, and the remaining (if any) part of the modules/units can be implemented by means of hardware such as circuitry; for various apparatuses and products applied to or integrated into a chip module, various modules/units contained therein can all be implemented by means of hardware such as circuitry, wherein different modules/units can be located in the same component (e.g., a chip, a circuit module, or the like) or different components of the chip module, or at least part of the modules/units can be implemented by means of a software program which runs on a processor integrated within the chip module, and the remaining (if any) part of the modules/units can be implemented by means of hardware such as circuitry; and for various apparatuses and products applied to or integrated into a terminal, various modules/units contained therein can all be implemented by means of hardware such as circuitry, wherein different modules/units may be located in the same component (e.g., a chip, a circuit module, or the like) or different components within the terminal, or at least part of the modules/units can be implemented by means of a software program which runs on a processor integrated within the terminal, and the remaining (if any) part of the modules/units can be implemented by means of hardware such as circuitry.

Embodiments of this disclosure further provide a computer-readable storage medium, the computer-readable storage medium being a non-volatile storage medium or a non-transitory storage medium having a computer program stored thereon, wherein the computer program, when run by a processor, performs the steps of a method provided in the embodiment corresponding to FIG. 1 or FIG. 9 as described above.

Embodiments of this disclosure further provide another apparatus for improving the resolution of a LiDAR, including a memory and a processor, wherein the memory has a computer program stored thereon that can be run on the processor, and the processor, when running the computer program, performs the steps of a method provided in the embodiment corresponding to FIG. 1 or FIG. 9 as described above.

Embodiments of this disclosure further provide an electronic device, including a memory and a processor, wherein the memory has a computer program stored thereon that can be run on the processor, and the processor, when running the computer program, performs the steps of a method provided in the embodiment corresponding to FIG. 1 or FIG. 9 as described above.

In embodiments of this disclosure, the processor can be a central processing unit (CPU), and the processor can also be other general-purpose processors, digital signal processors (DSP), application-specific integrated circuits (ASIC), field programmable gate arrays (FPGA), or other programmable logic devices, discrete gates, or transistor logic devices, discrete hardware components, or the like. The general-purpose processor can be a microprocessor, or the processor may also be any conventional processor, or the like.

It should also be understood that the memory in embodiments of this disclosure can be volatile memory or non-volatile memory, or may include both volatile and non-volatile memory. Among them, the non-volatile memory can be read-only memory (ROM), programmable ROM (PROM), erasable PROM (EPROM), electrically EPROM (EEPROM), or flash memory. The volatile memory can be random access memory (RAM), which is used as an external cache. By way of exemplary, but not limiting, illustration, many forms of random access memory (RAM) are available, such as static RAM (SRAM), dynamic RAM (DRAM), synchronous DRAM (SDRAM), double data rate SDRAM (DDR SDRAM), enhanced synchronous SDRAM (enhanced SDRAM), synchlink DRAM (SLDRAM), and direct rambus RAM (DR RAM).

It should be understood that the term "and/or", as used herein, only describes an association relationship of associated objects and indicates that three relationships can exist. For example, A and/or B may represent three situations: A exists alone, both A and B exist, and B exists alone. In addition, the character "/" herein means that the associated objects before and after it are in an "or" relationship.

The term "plurality" as it appears in the embodiments of this disclosure refers to two or more.

Descriptions such as the first and the second appearing in the embodiments of this disclosure are only for the purpose of schematic illustration and distinguishing the described objects, and are in no order, nor do they indicate a particular limitation on the number of devices in the embodiments of this disclosure, and cannot form any limitation on the embodiments of this disclosure.

The "connection" in the embodiments of this disclosure refers to various connection manners such as a direct connection or an indirect connection to realize the communication between devices, which is not limited in any way in the embodiments of this disclosure.

Although this disclosure is disclosed as above, it is not limited thereto. Any person skilled in the art may make various changes and modifications without departing from the spirit and scope of this disclosure, and therefore the scope of protection of this disclosure shall be subject to the scope limited by the claims.

The invention claimed is:

1. A method for improving a resolution of a LiDAR, the method comprising:
    determining at least one interpolation channel to be generated;
    separately determining, for each interpolation channel to be generated, one or more associated channels among a plurality of actual channels that are related to the interpolation channel to be generated, the plurality of actual channels being comprised by the Lidar and an actual channel comprising one emitter at an emitting end and one detector at a detecting end;
    determining weights of the one or more associated channels with respect to the interpolation channel to be generated; and
    generating a waveform of the interpolation channel based on waveform information of the one or more associated channels and the weights thereof, and determining point cloud data of the LiDAR based on the waveform information of each actual channel and each interpolation channel.

2. The method of claim 1, wherein determining the at least one interpolation channel further comprises:
    determining the at least one interpolation channel based on a range of an angle for a field of view for which interpolation is required.

3. The method of claim 1, wherein the at least one interpolation channel is distributed between the actual channels.

4. The method of claim 1, wherein separately determining the one or more associated channels among the plurality of the actual channels further comprises:
    determining an actual channel as an associated channel of the interpolation channel when a distance from that actual channel to the interpolation channel is within a set range.

5. The method of claim 4, wherein the weight of the associated channel is determined based on any one or more of:
    the distance from the associated channel to the interpolation channel; or
    a signal quality of the associated channel; or
    an angle for the field of view of the associated channel.

6. The method of claim 1, wherein emitters of the LiDAR are in a two-dimensional arrangement, and receivers of the LiDAR are in a two-dimensional arrangement.

7. The method of claim 6, wherein the one or more associated channels corresponding to the interpolation channel comprise at least two vertically adjacent actual channels and at least two horizontally adjacent actual channels.

8. The method of claim 1, wherein when the LiDAR utilizes multi-pulse coding, generating the waveform of the interpolation channel comprises:
    generating the waveform of the interpolation channel based on waveform information of pulses firstly received by the one or more associated channels and the weights thereof.

9. The method of claim 1, wherein the LiDAR emits signal light a plurality of times in one cycle; and the method further comprises:
    determining, after each emission of the signal light and based on the obtained waveform information of each actual channel and each interpolation channel, point cloud data that corresponds to each piece of waveform information corresponding to a respective emission; and
    determining one frame of point cloud data of the LiDAR based on all the point cloud data determined in one cycle.

10. An apparatus for improving a resolution of a LiDAR, the apparatus comprising:
    an interpolation channel determination module that determines at least one interpolation channel to be generated;
    an associated channel determination module that separately determines, for each interpolation channel to be generated, one or more associated channels among a plurality of actual channels that are related to the interpolation channel to be generated, the plurality of actual channels being comprised by the Lidar and an actual channel comprising one emitter at an emitting end and one detector at a detecting end;
    a weight determination module that determines weights of the one or more associated channels with respect to the interpolation channel to be generated; and
    an interpolation channel generation module that generates a waveform of the interpolation channel based on waveform information of the one or more associated channels and the weights thereof, and determines point cloud data of the LiDAR based on the waveform information of each actual channel and each interpolation channel.

11. The apparatus of claim 10, wherein
    the interpolation channel determination module determines the at least one interpolation channel to be generated based on a range of angles for a field of view for which interpolation is required.

12. The apparatus of claim 10, wherein the at least one interpolation channel is distributed between the actual channels.

13. The apparatus of claim 10, wherein
    the associated channel determination module determines an actual channel as an associated channel of the interpolation channel when a distance from that actual channel to the interpolation channel is within a set range.

14. The apparatus of claim 11, wherein the associated channel determination module determines the weight of the associated channel based on any one or more of:
    the distance from the associated channel to the interpolation channel; or
    a signal quality of the associated channel; or
    an angle for a field of view of the associated channel.

15. The apparatus of claim 10, wherein emitters of the LiDAR are in a two-dimensional arrangement, and detectors of the LiDAR are in two-dimensional arrangements.

16. The apparatus of claim 15, wherein the one or more associated channels corresponding to the interpolation channel to be generated comprise at least two vertically adjacent actual channels and at least two horizontally adjacent actual channels.

17. The apparatus of claim 10, wherein the LiDAR utilizes multi-pulse coding; and the interpolation channel generation module generates the waveform of the interpolation channel based on waveform information of pulses firstly received by the associated channels and the weights thereof.

18. The apparatus of claim 10, wherein the LiDAR emits signal light a plurality of times in one cycle; and the apparatus further comprises:
a first data determination module that determines, after each emission of the signal light and based on the waveform information of each actual channel and each interpolation channel, point cloud data that corresponds to each piece of waveform information and corresponds to a respective emission; and
a second data determination module that determines one frame of point cloud data of the LiDAR based on all the point cloud data determined in one cycle.

19. A LiDAR comprising:
a plurality of emitters arranged in a two-dimensional arrangement at an emitting end;
a plurality of detectors arranged in a two-dimensional arrangement at a detecting end; and
a processor configured to execute a method for improving a resolution of detection, wherein the method comprises:
determining at least one interpolation channel to be generated;
separately determining, for each interpolation channel to be generated, one or more associated channels among a plurality of actual channels that are related to the interpolation channel to be generated, the plurality of actual channels being comprised by the Lidar and an actual channel comprising one emitter at an emitting end and one detector at a detecting end;
determining weights of the one or more associated channels with respect to the interpolation channel to be generated; and
generating a waveform of the interpolation channel based on waveform information of the one or more associated channels and the weights thereof, and determining point cloud data of the LiDAR based on the waveform information of each actual channel and each interpolation channel.

20. The LiDAR of claim 19, wherein the one or more associated channels corresponding to the interpolation channel comprise at least two vertically adjacent actual channels and at least two horizontally adjacent actual channels.

* * * * *